(12) United States Patent
Das et al.

(10) Patent No.: US 11,520,702 B2
(45) Date of Patent: Dec. 6, 2022

(54) SYSTEM AND METHOD FOR MANAGING CACHE MEMORY

(71) Applicant: Wipro Limited, Bangalore (IN)

(72) Inventors: Rishav Das, Howrah (IN); Sourav Mudi, Burdwan (IN)

(73) Assignee: Wipro Limited, Bangalore (IN)

(*) Notice: Subject to any disclaimer, the term of this patent is extended or adjusted under 35 U.S.C. 154(b) by 285 days.

(21) Appl. No.: 16/701,524

(22) Filed: Dec. 3, 2019

(65) Prior Publication Data

US 2021/0096992 A1 Apr. 1, 2021

(30) Foreign Application Priority Data

Oct. 1, 2019 (IN) .............................. 201941039819

(51) Int. Cl.
*G06F 12/0815* (2016.01)
*G06F 11/14* (2006.01)
*G06N 20/00* (2019.01)

(52) U.S. Cl.
CPC ...... *G06F 12/0815* (2013.01); *G06F 11/1469* (2013.01); *G06N 20/00* (2019.01); *G06F 2201/82* (2013.01); *G06F 2201/84* (2013.01); *G06F 2212/1032* (2013.01); *G06F 2212/152* (2013.01)

(58) Field of Classification Search
CPC ............. G06F 12/0815; G06F 11/1469; G06F 2201/82; G06F 2201/84; G06F 2212/1032; G06F 2212/152; G06N 20/00

USPC .......................................................... 714/15
See application file for complete search history.

(56) References Cited

U.S. PATENT DOCUMENTS

| 8,656,112 | B2 | 2/2014 | Cain, III et al. |
| 10,289,555 | B1 | 5/2019 | Michaud et al. |
| 2007/0185903 | A1* | 8/2007 | Ramesh ............ G06F 16/24552 |
| 2014/0365725 | A1* | 12/2014 | Barrell .................. G06F 3/0604 |
| | | | 711/113 |
| 2018/0075013 | A1 | 3/2018 | Razack et al. |
| 2018/0293171 | A1 | 10/2018 | Joshi et al. |

FOREIGN PATENT DOCUMENTS

| CN | 108459970 A | 8/2018 |
| CN | 108810041 A | 11/2018 |

\* cited by examiner

*Primary Examiner* — Yair Leibovich
(74) *Attorney, Agent, or Firm* — Finnegan, Henderson, Farabow, Garrett & Dunner, LLP

(57) ABSTRACT

The present invention discloses a method and a system for managing cache memory. The system comprising a processor is configured to receive datasets from one or more applications, segregate the received datasets into one or more data blocks, identify a checkpoint from previously created checkpoints stored in a virtual cache corresponding to the one or more data blocks, wherein the checkpoints are previously created based on frequency of repetition of each of the one or more data blocks and association between the each of the one or more data blocks, recall a sequence of previously stored data blocks from main memory based on the identified checkpoint, and send the sequence of previously stored data blocks to the one or more applications for execution, thereby managing cache memory.

12 Claims, 5 Drawing Sheets

SYSTEM AND METHOD FOR MANAGING CACHE MEMORY

TECHNICAL FIELD

The present subject matter is related in general to memory management, more particularly, but not exclusively to a method and a system for managing cache memory for enhanced memory performance.

BACKGROUND

Conventional data storage systems include high speed, short term cache memory which can be accessed much more rapidly by a coupled computer system, commonly referred to as a host system, without delays associated with the mechanical motion and time delay inherent in a long term storage device such as a disk drive. Thus, if data requested by a host is stored in cache instead of the disk drive, performance can be increased tremendously. Cache memory, however, is a finite resource. More particularly, the size of cache memory relative to the capacity of disk drives is generally low. Moreover, the cache memory is typically more expensive than storage subsystem memory. Thus, in the absence of the cache memory, the data needs to be retrieved every time from the data storage system, which further increases the latency. Moreover, when data transaction is frequent and random, in response to said data transaction, the cache may snoop its cached data and provide a response in a response phase of the data transaction. Since, the conventional cache is typically short, delayed reporting of the state of cached data may result in increased latency for the data transaction.

In order to overcome the problem of the limited memory for the conventional cache, an existing cache memory management system includes one or more methods of deriving the expanded memory for the conventional cache memory by the mechanism of using the limited memory and virtualization of at least one memory to derive a virtual cache. However, the virtual cache for the known cache memory management system has a problem in which the underlying memory is consumed in the same manner as consumed in the conventional cache memory. Hence, the known mechanism of the virtualization of the at least one memory does not significantly expand the cache memory. Further, the known virtual cache for the cache memory management system does not include any mechanism which can be adapted to reduce the consumption of the underlying memory. Therefore, there is a need for an improved cache memory management that facilitates enhanced memory expansion for the conventional cache and additionally, provides mechanism for reducing the underlying memory consumption.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method of managing cache memory. The method includes receiving datasets from one or more applications, segregating the received datasets into one or more data blocks, identifying a checkpoint from previously created checkpoints stored in a virtual cache corresponding to the one or more data blocks, wherein the checkpoints are previously created based on frequency of repetition of each of the one or more data blocks and association between the each of the one or more data blocks, recalling a sequence of previously stored data blocks from main memory based on the identified checkpoint, and sending the sequence of previously stored data blocks to the one or more applications for execution, thereby managing cache memory.

In an embodiment, the present disclosure may relate to a cache management system. The cache management system may include a processor and a memory communicatively coupled to the processor, wherein the memory stores processor-executable instructions, which on execution, may cause the processor to receive datasets from one or more applications, segregate the received datasets into one or more data blocks, identify a checkpoint from previously created checkpoints stored in a virtual cache corresponding to the one or more data blocks, wherein the checkpoints are previously created based on frequency of repetition of each of the one or more data blocks and association between the each of the one or more data blocks, recall a sequence of previously stored data blocks from main memory based on the identified checkpoint, and send the sequence of previously stored data blocks to the one or more applications for execution, thereby manage cache memory.

In an embodiment, the present disclosure may relate to a non-transitory computer readable medium including instructions stored thereon that when processed by at least one processor cause a cache memory management system to perform operations comprising receiving datasets from one or more applications, segregating the received datasets into one or more data blocks, identifying a checkpoint from previously created checkpoints stored in a virtual cache corresponding to the one or more data blocks, wherein the checkpoints are previously created based on frequency of repetition of each of the one or more data blocks and association between the each of the one or more data blocks, recalling a sequence of previously stored data blocks from main memory based on the identified checkpoint, and sending the sequence of previously stored data blocks to the one or more applications for execution, thereby managing cache memory.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described below, by way of example only, and with reference to the accompanying figures.

Figure 1:
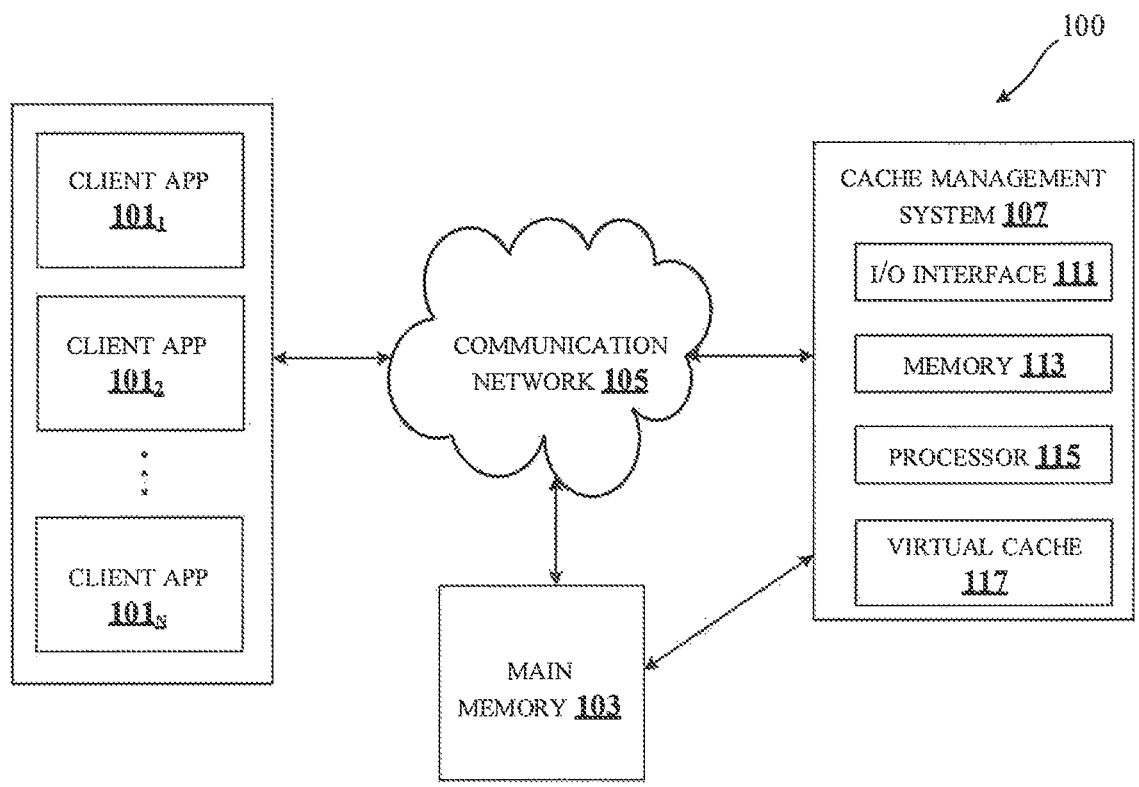
FIG. 1 illustrates an exemplary environment for managing cache memory in accordance with some embodiments of the present disclosure.

It should be appreciated by those skilled in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure relate to a method and a system for managing cache memory. The present disclosure discloses an improved cache memory management system comprising a novel architecture for a virtual cache that is configured to perform one or more mechanisms adapted for the understanding and learning of data blocks. In the present disclosure, the one or more mechanisms for the improved cache memory management system utilizes limited memory of a conventional cache and performs virtualization by adapting at least one memory to form the virtual cache. The at least one memory is configured to behave similar to the cache for immediate transactional Input Output Per Second (IOPS). Specifically, the transactional IOPS, at first, checks with cache memory if the data is present in at least a portion therein, else the transaction IOPS obtains the data from the main memory. Further, in the present disclosure, large set of IOPS are broken into small standard uniform data blocks by the virtual cache. The repetitive small data blocks are configured to train the datasets through a learning unit. Post-learning and reaching defined accuracy, the dataset is converted into one or more checkpoints. Thereafter, whenever said dataset is received, corresponding checkpoint is identified and sequence of data blocks associated with the checkpoint is recalled. More specifically, the dataset after being learned by the virtual cache is remembered in at least a portion therein based on the checkpoint values and weights, thereby facilitating large data storage in the virtual cache and additionally handling of large amount of incoming of the data. Furthermore, the prediction and generation of IOPS is adapted for reducing the storing space for storing the data blocks of the IOPS. More specifically, the data is converted into one or more checkpoints such that at least one checkpoint is configured to consume at least 10% of the original dataset. Hence, the present disclosure describes an efficient method of storing the data by the virtual cache of the improved cache memory management system.

In the present disclosure, the virtual cache may be derived by one or more mechanisms of virtualization of at least one memory. Specifically, the virtual cache is the conventional virtualized cache memory. The virtual cache may be assigned by an end user or system-generated or application specific generation. The size of the virtualized cache memory may be determined by the end user based on the applicability of the virtual cache memory or it may be auto-generated by the system.

FIG. 1 illustrates an exemplary environment for managing cache memory in accordance with some embodiments of the present disclosure.

As shown in the FIG. 1, the environment 100 includes a client app (client application) $101_1$, a client app $101_2$, . . . , a client app $101_N$ (collectively referred as client applications 101), a main memory 103, a communication network 105 and a cache management system 107. The client applications 101 may be connected through the communication network 105 to the cache management system 107. In an embodiment, in addition to the client applications 101, the environment 100 may comprise one or more system-based applications (not shown in the FIG. 1). The system-based application may belong to server-side application where a server is operated and maintained. Here, the server may be an individual server or part of a server network system. The types of server may include, not limited to, proxy server, mail server, server platforms, web server, application server, real-time communication server, FTP server and collaboration server.

In an embodiment, one or more client applications 101 may be offline system-oriented applications. In this case, the system-oriented offline application may be connected remotely. Also, the one or more client applications 101 may be server-hosted applications, which is an online system and may be accessed from any location. In an embodiment, one or more cloud servers (not shown in the FIG. 1) may, also, be connected to the cache management system 107.

In an embodiment, the cache management system 107 may include an I/O interface 111, a memory 113, a processor 115 and a virtual cache 117. The I/O interface 110 may be configured to receive datasets from one or more client applications 101. Analogously, the I/O interface 111 may be configured to send (recalled) data blocks to the one or more client applications 101 for execution. The I/O interface 111 may employ communication protocols/methods such as, without limitation, audio, analog, digital, monoaural, Radio Corporation of America (RCA) connector, stereo, IEEE-1394 high speed serial bus, serial bus, Universal serial bus (USB), infrared, Personal system/2 (PS/2) port, Bayonet Neill-Concelman (BNC) connector, coaxial, component, composite, Digital visual interface (DVI), High-definition multimedia interface (HDMI), Radio frequency (RF) antennas, S-Video, Video graphics array (VGA), IEEE 802.11b/g/n/x, Bluetooth, cellular (e.g., Code-division multiple access (CDMA), High-speed packet access (HSPA+), Global system for mobile communications (GSM), Long-term evolution (LTE), Worldwide interoperability for microwave access (WiMax), or the like.

The datasets received by the I/O interface 111 and a sequence of previously stored data blocks recalled from the main memory 103 (also, called recalled data) to be sent to the one or more client applications 101 through the I/O interface 111 may be stored in the memory 113. The memory 113 may be communicatively coupled to the processor 115 of the cache management system 107. The memory 113 may, also, store processor instructions which may cause the processor 115 to execute the instructions for recalling the sequence of previously stored data blocks from the main memory 103, The memory 113 may include, without limitation, memory drives, removable disc drives, etc. The memory drives may further include a drum, magnetic disc drive, magneto-optical drive, optical drive, Redundant Array of Independent Discs (RAID), solid-state memory devices, solid-state drives, etc.

In an embodiment, the main memory 103 may comprise a conventional cache. The main memory 103 is configured to store data under operation. The main memory 103 may be integrated, directly-attached or network-attached to the memory 113. The memory 113 may, also, be a part of distributed cache technique, which is configured in providing storage blocks, which act as a cache. The memory 113 may be connected to an external storage or to a large-scale enterprise infrastructure. The memory 113 may, also, be connected with cloud server.

In an embodiment, the cache management system 107 may include kernel (not shown in the FIG. 1). The kernel may be communicatively coupled to the virtual cache of the cache management system 107 and one or more client applications 101 via the I/O interface 111 and the communication network 105. The kernel may be configured to provide one or more essential services including memory management required by one or more client applications 101. Particularly, the virtual cache 117 may be operated by the kernel based on the request of one or more client applications 101. The kernel may be adapted for facilitating in conversion of the application request into lower level language for execution.

The processor 115 may include at least one data processor for recalling and sending a sequence of previously stored data blocks to the one or more client applications 101. The processor 115 may include specialized processing units such as integrated system (bus) controllers, memory management control units, floating point units, graphics processing units, digital signal processing units, etc.

The virtual cache 117 may be configured to determine required output i.e. a sequence of previously stored data blocks from the main memory 103 based on checkpoint. The explanation on checkpoint is provided with respect to FIG. 2 below. The virtual cache 117 may be communicatively coupled to the kernel and the main memory 103. A detailed description on the virtual cache 117 is presented later with reference to the FIG. 2.

The communication network 105 may include, but is not limited to, a direct interconnection, an e-commerce network, a Peer-to-peer (P2P) network, Local area network (LAN), Wide area network (WAN), wireless network (for example, using Wireless Application Protocol), Internet, Wi-Fi, Bluetooth and the like.

Figure 2:
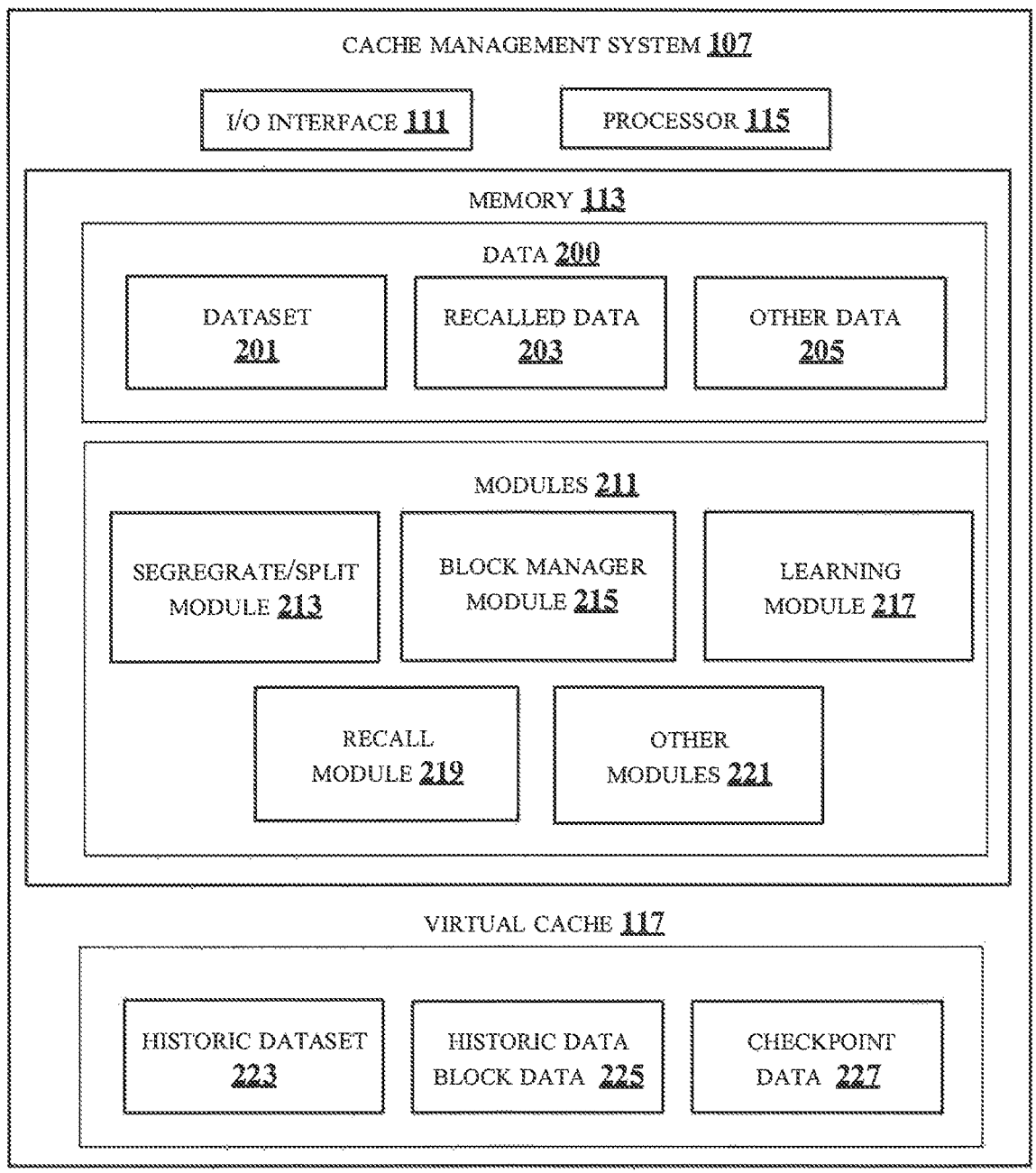
FIG. 2 shows a detailed block diagram of a cache memory management system in accordance with some embodiments of the present disclosure.

FIG. 2 shows a detailed block diagram of a cache memory management system in accordance with some embodiments of the present disclosure.

The cache memory management system 107, in addition to the I/O interface 111 and processor 115 described above, may include data 200, one or more modules 211 and virtual cache 117, which are described herein in detail. In the embodiment, the data 200 may be stored within the memory 113. The data 200 may include, for example, dataset 201, recalled data 203 and other data 205.

The dataset 201 may include datasets received from one or more client applications 101. Here, the datasets may include data. For instance, a client application may request data or store the data, wherein the data may be subjected to any kind of operations as decided by the client application. The data that is highly repetitive with time is stored in the virtual cache 117. The client application operation may include writing the data, extracting the data, performing one or more operations on the data including logical and arithmetical operations. The dataset 201 indicates data received from one or more client applications 101 in real-time.

The recalled data 203 may include a sequence of data blocks recalled from the main memory 103 by a recall module 219 and stored in the recalled data 203. The recalled sequence of data blocks has an associated checkpoint. When a checkpoint is identified for a dataset, a sequence of previously stored data blocks associated with the identified checkpoint is recalled from the main memory 103 and stored in the recalled data 203.

The other data 205 may store data, including temporary data and temporary files, generated by the modules 211 and/or the virtual cache 117 for performing the various functions of the cache management system 107.

In the embodiment, the virtual cache 117 may include historic dataset 223, historic data block data 225 and checkpoint data 227.

The historic dataset 223 may include historic datasets received from one or more client applications 101. Here, the historic datasets may include historic data, which is analogous to the dataset 201. The historic dataset 223 indicates data received from one or more client applications 101 in the past.

The historic data block data 225 may include historic data blocks obtained by splitting the historic datasets received from one or more client applications 101.

The checkpoint data 227 may include checkpoints created for the plurality of historic data blocks. The basis for checkpoint creation depends on frequency of repetition of each of one or more historic data blocks and association between each of the one or more historic data blocks.

In an embodiment, the cache management system 107 may include kernel (not shown in the FIG. 2). The kernel may be adapted for facilitating in conversion of the application request into lower level language for execution. For instance, the kernel may transform the application request into machine instruction. The one or more operations to be performed by the application may be passed through kernel. The kernel may be configured to convert the instruction of the application into machine language-based instruction, which is basically system calls. The system calls help to initiate communication with the virtual cache 117.

In the embodiment, the data 200 in the memory 113 are processed by the one or more modules 211 present within the memory 113 of the cache management system 107. In the embodiment, the one or more modules 211 may be implemented as dedicated hardware units. As used herein, the term module refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. In some implementations, the one or more modules 211 may be communicatively coupled to the processor 115 for performing one or more functions of the cache management system 107. The said modules 211 when configured with the functionality defined in the present disclosure will result in a novel hardware.

In one implementation, the one or more modules 211 may include, but are not limited to, a segregate/split module 213, a block manager module 215, a learning module 217 and a recall module 219. The one or more modules 211 may, also, include other modules 221 to perform various miscellaneous functionalities of the cache management system 107.

The segregate/split module 213 may receive or fetch historic datasets from at least one of the client applications 101 via the I/O interface 111 and may store the historic datasets in the historic dataset 223 of the virtual cache 117. Subsequently, the segregate/split module 213 may split the historic datasets into a plurality of historic data blocks. Analogously, during real-time, the segregate/split module 213 may receive datasets from one or more client applications 101 via the I/O interface 111 and may store the datasets in the dataset 201. The segregate/split module 213 may split the received datasets into one or more data blocks.

The block manager module 215 may store one or more data blocks in the historic data block data 225 of the virtual cache 117. The dataset, which in turn is split into data blocks, that are highly repetitive in time need to be stored in the virtual cache 117. The block manager module 215 is configured to measure Input Output Per Second (IOPS) flow rate. The data blocks may be new data blocks of the IOPS or it may be old data blocks i.e. data blocks that were received earlier. The data blocks of IOPS are received and are processed by the block manager 215 and stored in the historic data block data 225 of the virtual cache 117. The block manager module 215 may determine frequency and associativity of the stored data blocks. Here, the frequency refers frequency of repetition of each of one or more data blocks and association refers to association between the each of one or more data blocks stored in the virtual cache 117. The frequency and associativity are key factors to efficiently utilize the virtual cache 117. The frequency is measured by the number of times the IOPS has been requested for retrieval or storing of the data blocks. The dataset is split or segregated into a sequence of data blocks to be processed by the block manager module 215. More frequent data blocks are allowed to reside in the virtual cache 117. A data block with minimum predetermined frequency of at least 6 Hz is to be taken into a list of similar frequency threshold score/rate. The threshold further takes only highly valued data blocks and their associativity is determined based on the combination of the data blocks to be appearing in the application request. Based on the threshold, the score is evaluated and further the combinations are made out of it until it reaches to single set of input combined with multiple associated data blocks. The associativity scores are maintained by the block manager 215, which again may be subjected to change or re-evaluation based on the periodic frequency of the data blocks.

The learning module 217 may learn the determined associativity and data blocks in the virtual cache 117. Learning of said associated data blocks help to determine many types of input which may actually result in similar kind of output. The learning module 217 of the virtual cache 117 is configured for learning of the associativity, the data blocks content and relative data block by using predictive analytics or deep learning techniques. The data contents include group of words, phrases and clauses, which are further broken into small data blocks. These data blocks are then temporarily stored in the virtual cache 117 for lemmatization and stemming technique. For post-processing, the data blocks are fed into the learning module 217 for training with the content of the data. The learning module 217 comprises of Long Short-Term Memory (LSTM) model or Convolutional Neural Network (CNN) or Custom NN based on the type of data it has to handle. The data blocks and the pattern of the associativity are provided as an input to LSTM. At first, only relevant data blocks are allowed to get inside the LSTM for further analysis and training based on the frequency as well as pattern of the data blocks. The weightage may be the frequency of the data blocks and bias can be the pattern of associativity for Custom NN. These iterations proceed until the accuracy gets saturated with successive repetition of the data blocks. The successive repetition of the data blocks helps improve the efficiency and accuracy of the training in LSTM. These are, also, other performance improvement methodology that may be applied while training in LSTM such as Gated Recurrent Unit (GRU), which is used to determine the vanishing gradient of the dataset. GRU works with LSTM architecture but the selectivity of data blocks (tokens) is fine tuned to reduce the length of eligible data blocks (tokens) by LSTM. This mechanism eliminates the gradient bugs/errors from the system.

The recall module 219 may recall the required IOPS or sequence of previously stored data blocks from the main memory 103 using checkpoint, which has been requested by one or more client applications 101. After understanding and learning of the data blocks by the learning module 217, the recall module 219 is configured to create a checkpoint, which is further stored in the checkpoint data 227 of the virtual cache 117. The checkpoint is a numeric data that is used to recall data blocks that have been learned by the learning module 217. Here, the virtual cache 117 may be configured for storing the data blocks in the form checkpoint and may further utilize the checkpoint to fetch the data blocks from the main memory 103 without actually storing the actual data blocks in the virtual cache 117. The checkpoint is very small hence requires less memory. The checkpoints are created based on frequency of repetition of each of the one or more data blocks and association between the each of the one or more data blocks. The interpretation of the checkpoint is a key factor of the IOPS based on the request of the data blocks. The recalling of the sequence of previously stored data blocks are based on the application request, which are interpreted by the checkpoint. The recall module 219 identifies a checkpoint from previously created checkpoints stored in the checkpoint data 227 corresponding to the data blocks. In the next step, the recall module 219 recalls previously stored data blocks based on the identified checkpoints. This retrieval of the data blocks is based on the prediction of the past pattern learning as well as content of the data blocks. Using these predicted data blocks, the data blocks are temporarily stored in the recalled data 203 before sending to one or more applications for execution.

Once the data blocks or sequence of the data blocks for the one or more client applications 101 are predicted, then the data blocks or the sequence of the data blocks are forwarded to the one or more client applications 101 by the recall module 219. This mechanism takes place continuously while using the client application. Similarly, for system-based application, the server configuration may include request which gets connected with the virtual cache 117 such that the server reverts the output data generated by the virtual cache 117 back to the system-based application.

In case of errors, the learning module 217 may adjust or correct the errors in the recalled data blocks and re-train the data blocks along with corresponding checkpoint in the virtual cache 117. The errors are typically in the data block/data blocks, which are falsely predicted. The errors in the recalled data blocks are identified by comparing the recalled sequence of data blocks and predicted sequence of data blocks. In brief, the difference in outputs while training fits itself with existing module/output and further the error between two outputs is extracted and the learning module 217 is re-trained. The recall module 219 determines the error and updates the learning module 217 for re-training of the data blocks. These data blocks may be subjected to N-fold cross validation technique. The N-fold cross validation technique is used for testing the dataset while learning and not post-learning. The learning curve depends on concurrent learning of the dataset. With each iteration of learning, the technique predicts the output. If the predicted output matches with the given output while training, then the technique proceeds with the next set of iterations.

Figure 3:
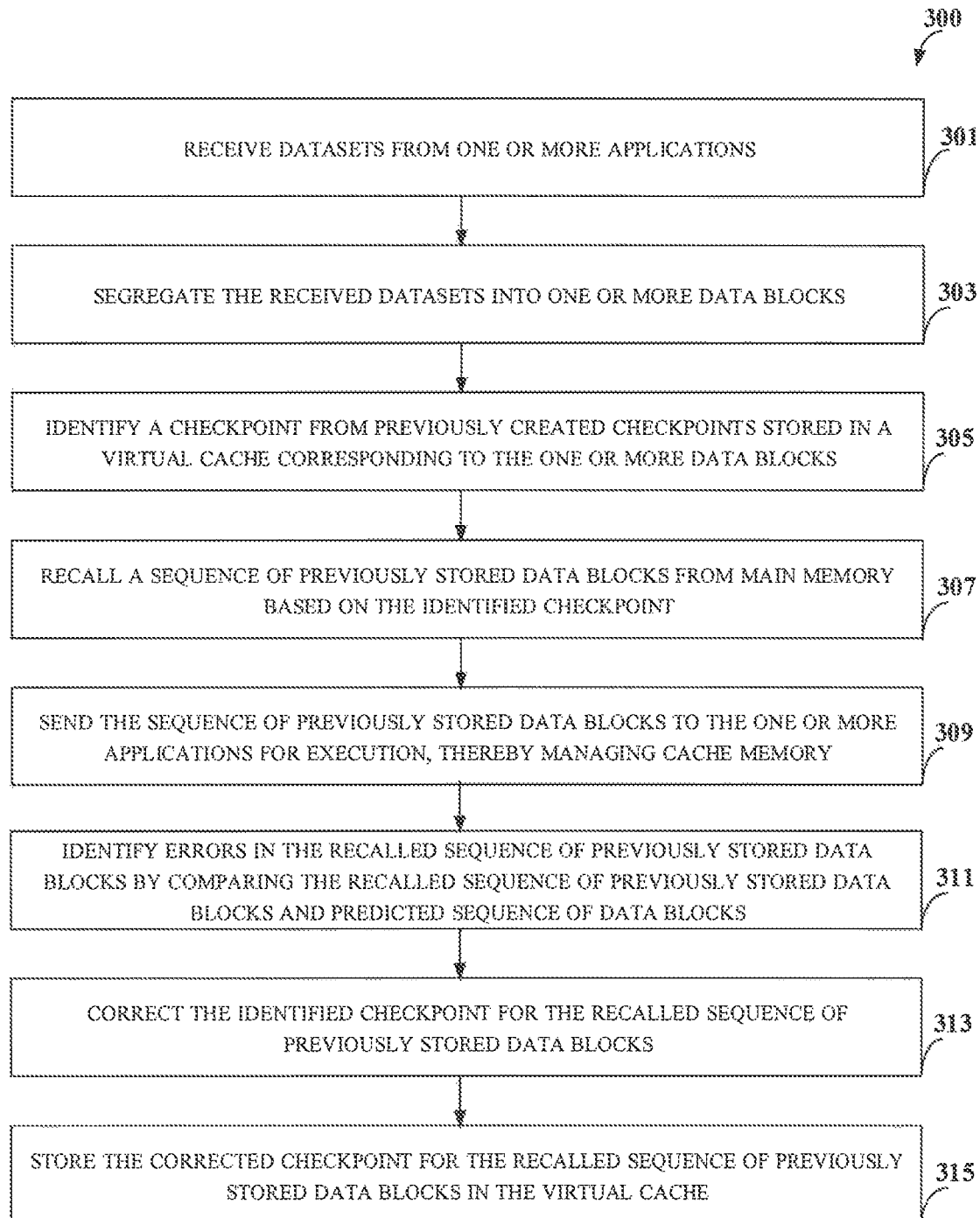
FIG. 3 illustrates a flowchart showing a method of managing cache memory in accordance with some embodiments of the present disclosure.

FIG. 3 illustrates a flowchart showing a method of managing cache memory in accordance with some embodiments of the present disclosure.

As illustrated in FIG. 3, the method 300 includes one or more blocks for managing cache memory. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the segregate/split module 213 may receive datasets from one or more applications.

At block 303, the segregate/split module 213 may segregate the received datasets into one or more data blocks.

At block 305, the recall module 219 may identify a checkpoint from previously created checkpoints stored in the virtual cache 117 corresponding to the one or more data blocks. Here, the checkpoints are previously created based on frequency of repetition of each of the one or more data blocks and association between the each of the one or more data blocks.

At block 307, based on the identified checkpoint, the recall module 219 may recall a sequence of previously stored data blocks from the main memory 103.

At block 309, the recall module 219 may send the sequence of previously stored data blocks recalled from the main memory 103 to the one or more applications for execution via the I/O interface 111 and the communication network 105.

At block 311, the recall module 219 may identify any errors in the recalled sequence of previously stored data blocks by comparing the recalled sequence of previously stored data blocks and predicted sequence of data blocks.

At block 313, the learning module 217 may correct the identified checkpoint for the recalled sequence of previously stored data blocks.

At block 315, the learning module 217 may store the corrected checkpoint for the recalled sequence of previously stored data blocks in the checkpoint data 227 of the virtual cache 117.

Figure 4:
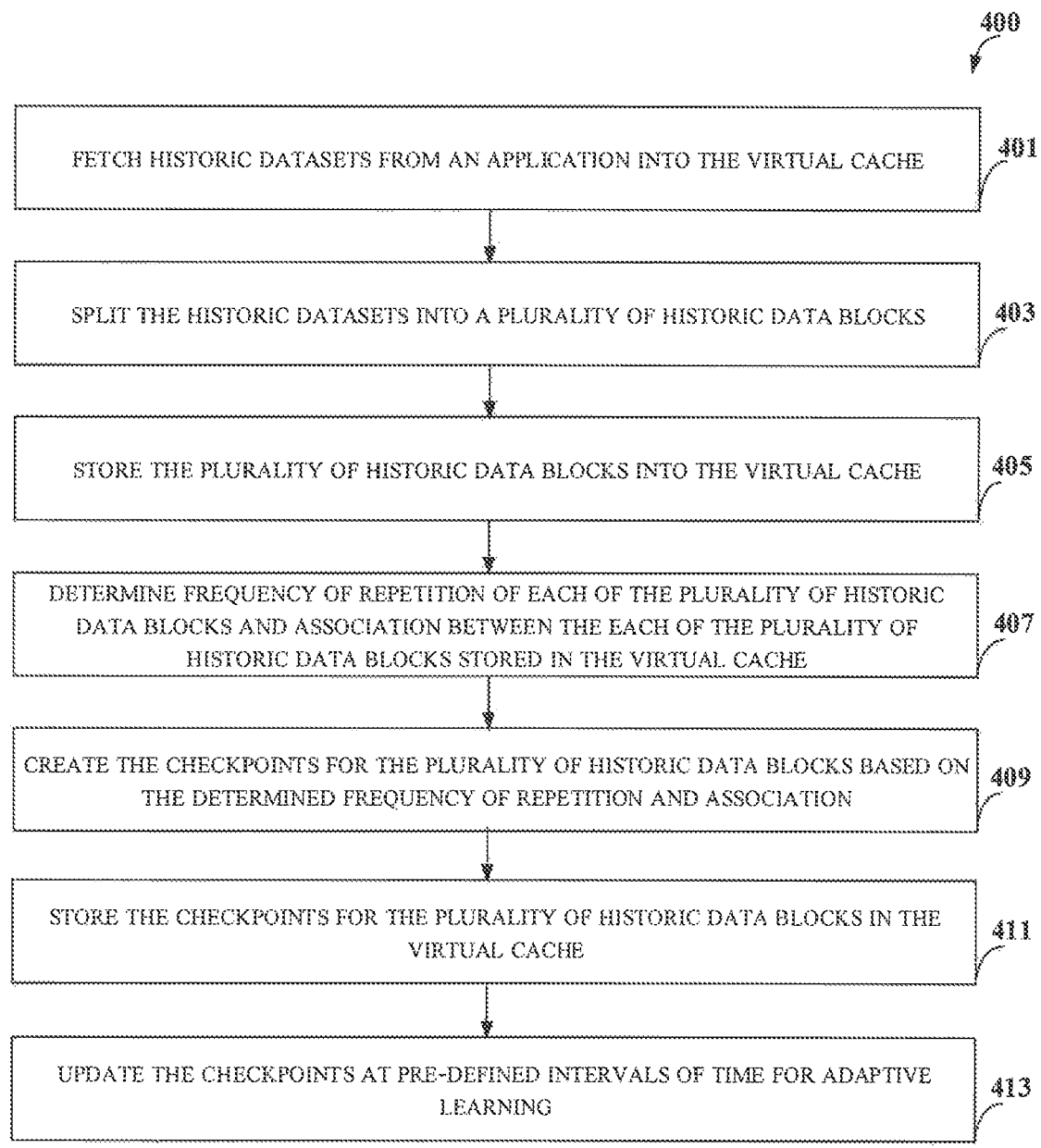
FIG. 4 illustrates a flowchart showing a method for creating checkpoints to be used in managing cache memory in accordance with some embodiments of present disclosure.

FIG. 4 illustrates a flowchart showing a method for creating checkpoints to be used in managing cache memory in accordance with some embodiments of present disclosure.

As illustrated in FIG. 4, the method 400 includes one or more blocks for creating checkpoints. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the segregate/split module 213 may fetch or receive historic datasets from one or more application into the virtual cache 117. Furthermore, the segregate/split module 213 may store the historic datasets in the historic dataset 223.

At block 403, the segregate/split module 213 may split the historic datasets into a plurality of historic data blocks. For example, if instruction (dataset) is received as ABCD, the segregate/split module 213 may split the instruction ABCD into data block A, data block B, data block C and data block D.

At block 405, the plurality of historic data blocks may be stored by the block manager module 215 in the historic data block data 225 of the virtual cache 117.

At block 407, the block manager module 215 determines frequency of repetition of each of the plurality of historic data blocks and association between the each of the plurality of historic data blocks stored in the historic data block data 225. For example, data block A is $1^{st}$ instruction, data block B is $2^{nd}$ instruction, data block C is $3^{rd}$ instruction and data block D is $4^{th}$ instruction. Suppose every time data block A comes followed by data block B, which is followed by data block C. But, data block D does not come every time. In this case, the cache management system 107 determines frequency of repetition A, B, C and D individually and association between them i.e. data blocks A, B and C come together every time and data block D comes sometimes.

At block 409, the learning module 217 may create checkpoints for the plurality of historic data blocks based on the determined frequency of repetition and association at block 407. For example, suppose data blocks A, B and C come 90% of time together and data blocks A, B, C and D come 80% of time together. In this situation, since data block D does not follow the data blocks A, B and C, the cache management system 107 learns data blocks A, B and C and does not learn data block D i.e. the system stores data block D in the virtual cache independent of data blocks A, B and C. In this case, the system learns that data block A is followed by B and B is followed by C. The system learns this sequence or pattern based on frequency of repetition and association of data blocks and creates a checkpoint for this sequence. Instead of storing the data blocks A, B and C, the system stores the checkpoint in the virtual cache.

At block 411, after the checkpoints are created, the learning module 217 may store the checkpoints for the plurality of historic data blocks in the checkpoint data 227 of the virtual cache 117.

Figure 5:
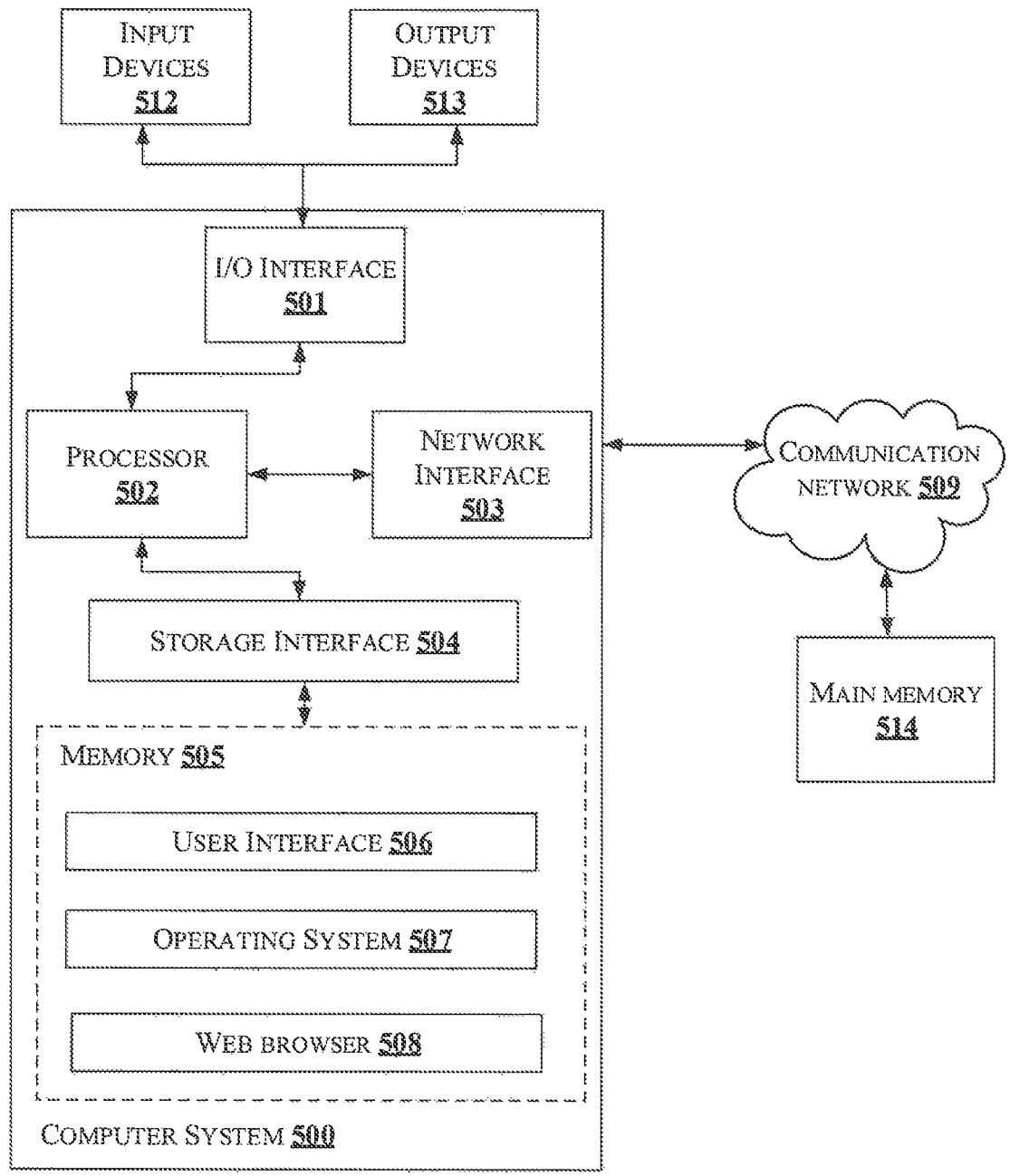
FIG. 5 illustrates a block diagram of an exemplary computer system for implementing embodiments consistent with the present disclosure.

At block 413, the learning module 217 may update the checkpoints at predefined intervals of time for adaptive learning purpose on receiving the respective plurality of historic data blocks. For instance, since the system keeps learning, suppose data blocks A, B, C and D become most frequent pattern or sequence as compared to previously most frequent pattern A, B and C, the system removes the stored data block D from the virtual cache and creates a new checkpoint for data blocks A, B, C and D together or updates the exiting checkpoint. This checkpoint is now stored in the virtual cache, Computing System FIG. 5 illustrates a block diagram of an exemplary computer system 500 for implementing embodiments consistent with the present disclosure. In an embodiment, the computer system 500 may be used to implement the cache management system 107. The computer system 500 may include a central processing unit ("CPU" or "processor") 502. The processor 502 may include at least one data processor for managing cache memory. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BICC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices such as input devices 512 and output devices 513. For example, the input devices 512 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 513 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the computer system 500 consists of the cache management system 107. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a main memory 514. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems 507 include, without limitation, APPLE MACINTOSH OS X, UNIXR, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/ 8, 10 etc.), APPLER IOS™, GOOGLER ANDROID™, BLACKBERRYR OS, or the like.

In some embodiments, the computer system 500 may implement a web browser 508 stored program component. The web browser 508 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX™, DHTML™, ADOBE® FLASH™, JAVASCRIPT™, JAVA™, Application Programming Interfaces (APIs), etc. In some embodiments, the computer system 500 may implement a mail server (not shown in FIG. 5) stored program component. The mail server may be an Internet mail server such as Microsoft Exchange, or the like. The mail server may utilize facilities such as ASP™, ACTIVEX™, ANSI™ C++/C#, MICROSOFT®, NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client (not shown in FIG. 5) stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

Some of the advantages of the present disclosure are listed below.

In an embodiment, the present disclosure describes an improved cache memory management system comprising mechanisms for utilizing the limited size of a conventional cache memory and enhancing data storage capacity.

In an embodiment, the present disclosure discloses the improved cache memory management system, which comprises of the novel architecture for a virtual cache such that the one or more features of the virtual cache is configured to reduce the latency.

In an embodiment, one or more features of the virtual cache is configured for automatic determination and detection of the IOPS data blocks.

In an embodiment, storing of checkpoint for a frequently repeating dataset instead of storing the dataset as it is in the virtual cache saves space in the virtual cache, thereby, facilitating large data storage in the virtual cache. For example, consider a dataset "ABCD" that is frequently received by the cache management system 107. In this case, instead of storing the frequently received dataset "ABCD" as it is in the virtual cache, a checkpoint, which identifies this dataset "ABCD" is stored in the virtual cache and the dataset "ABCD" is stored in the main memory 103.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

The terms "an embodiment", "embodiment", "embodiments", "the embodiment", "the embodiments", "one or ore embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 3 and 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | Environment |
| $101_1, 101_2 \ldots 101_N$ | Client Application |
| 103 | Main memory |
| 105 | Communication network |
| 107 | Cache management system |
| 111 | I/O interface |
| 113 | Memory |
| 115 | Processor |
| 117 | Virtual cache |
| 200 | Data |
| 201 | Dataset |
| 203 | Recalled data |
| 205 | Other data |
| 211 | Modules |
| 213 | Segregate/Split module |
| 215 | Block manger module |
| 217 | Learning module |
| 219 | Recall module |
| 221 | Other modules |
| 223 | Historic dataset |
| 225 | Historic data block data |
| 227 | Checkpoint data |
| 500 | Computer system |
| 501 | I/O interface |
| 502 | Processor |
| 503 | Network interface |
| 504 | Storage interface |
| 505 | Memory |
| 506 | User interface |
| 507 | Operating system |
| 508 | Web browser |
| 509 | Communication network |
| 512 | Input devices |
| 513 | Output devices |
| 514 | Main memory |

What is claimed is:

1. A method of managing cache memory, the method comprising:

receiving, by a cache memory management system, datasets from one or more applications;

segregating, by the cache memory management system, the received datasets into one or more data blocks;

identifying, by the cache memory management system, a checkpoint from previously created checkpoints stored in a virtual cache corresponding to the one or more data blocks, wherein the checkpoints are previously created based on frequency of repetition of each of the one or more data blocks and association between the each of the one or more data blocks;

recalling, by the cache memory management system, a sequence of previously stored data blocks from main memory based on the identified checkpoint; and sending, by the cache memory management system, the sequence of previously stored data blocks to the one or more applications for execution, thereby managing cache memory.

2. The method as claimed in claim 1, further comprising:

identifying, by the cache memory management system, errors in the recalled sequence of previously stored data blocks by comparing the recalled sequence of previously stored data blocks and predicted sequence of data blocks;

correcting, by the cache memory management system, the identified checkpoint for the recalled sequence of previously stored data blocks; and storing, by the cache memory management system, the corrected checkpoint for the recalled sequence of previously stored data blocks in the virtual cache.

3. The method as claimed in claim 1, wherein the checkpoints are created by:

fetching, by the cache memory management system, the datasets from an application into the virtual cache;

splitting, by the cache memory management system, the historic datasets into the one or more data blocks;

storing, by the cache memory management system, the one or more data blocks into the virtual cache;

determining, by the cache memory management system, frequency of repetition of each of the one or more data blocks and association between the each of the one or more data blocks stored in the virtual cache;

creating, by the cache memory management system, the checkpoints for the one or more data blocks based on the frequency of repetition and association; and storing, by the cache memory management system, the checkpoints for the one or more data blocks in the virtual cache.

4. The method as claimed in claim 3, the method further comprising:

updating, by the cache memory management system, the checkpoints at pre-defined intervals of time for adaptive learning.

5. A cache memory management system for managing cache memory, the system comprising:

a processor; and a memory communicatively coupled to the processor, wherein the memory stores processor-executable instructions, which on execution, cause the processor to:

receive datasets from one or more applications;

segregate the received datasets into one or more data blocks;

identify a checkpoint from previously created checkpoints stored in a virtual cache corresponding to the one or more data blocks, wherein the checkpoints are previously created based on frequency of repetition of each of the one or more data blocks and association between the each of the one or more data blocks;

recall a sequence of previously stored data blocks from main memory based on the identified checkpoint; and send the sequence of previously stored data blocks to the one or more applications for execution, thereby managing cache memory.

6. The cache memory management system as claimed in claim 5, wherein the processor is configured to;
   identify errors in the recalled sequence of previously stored data blocks by comparing the recalled sequence of previously stored data blocks and predicted sequence of data blocks;
   correct the identified checkpoint for the recalled sequence of previously stored data blocks; and
   store the corrected checkpoint for the recalled sequence of previously stored data blocks in the virtual cache.

7. The cache memory management system as claimed in claim 5, wherein the checkpoints are created by:
   fetching the datasets from an application into the virtual cache;
   splitting the datasets into the one or more data blocks;
   storing the one or more data blocks into the virtual cache;
   determining frequency of repetition of each of the one or more data blocks and association between the each of the one or more data blocks stored in the virtual cache;
   creating the checkpoints for the one or more data blocks based on the frequency of repetition and association; and
   storing the checkpoints for the one or more data blocks in the virtual cache.

8. The cache memory management system as claimed in claim 7, wherein the processor is configured to:
   updating the checkpoints at pre-defined intervals of time for adaptive learning.

9. A non-transitory computer readable medium including instructions stored thereon that when processed by at least one processor cause a cache memory management system to perform operations comprising:
   receiving datasets from one or more applications;
   segregating the received datasets into one or more data blocks;
   identifying a checkpoint from previously created checkpoints stored in a virtual cache corresponding to the one or more data blocks, wherein the checkpoints are previously created based on frequency of repetition of each of the one or more data blocks and association between the each of the one or more data blocks;
   recalling a sequence of previously stored data blocks from main memory based on the identified checkpoint; and
   sending the sequence of previously stored data blocks to the one or more applications for execution, thereby managing cache memory.

10. The medium as claimed in claim 9, wherein the instructions when processed by the at least one processor cause the cache memory management system to perform operations comprising:
   identifying errors in the recalled sequence of previously stored data blocks by comparing the recalled sequence of previously stored data blocks and predicted sequence of data blocks;
   correcting the identified checkpoint for the recalled sequence of previously stored data blocks; and
   storing the corrected checkpoint for the recalled sequence of previously stored data blocks in the virtual cache.

11. The medium as claimed in claim 9, wherein the instructions when processed by the at least one processor cause the cache memory management system to create the checkpoints by:
   fetching the datasets from an application into the virtual cache;
   splitting the datasets into the one or more data blocks;
   storing the one or more data blocks into the virtual cache;
   determining frequency of repetition of each of the one or more data blocks and association between the each of the one or more data blocks stored in the virtual cache;
   creating the checkpoints for the one or more data blocks based on the frequency of repetition and association; and
   storing the checkpoints for the one or more data blocks in the virtual cache.

12. The medium as claimed in claim 11, wherein the instructions when processed by the at least one processor cause the cache memory management system to perform operation comprising:
   updating the checkpoints at pre-defined intervals of time for adaptive learning.

\* \* \* \* \*